3,082,262
POLYMERIZABLE EMULSION AND PROCESS OF POLYMERIZATION

George W. Scott, Louisville, Ky., assignor to E. I. du Pont de Nemours and Company, Wilmington, Del., a corporation of Delaware
No Drawing. Filed Apr. 28, 1960, Ser. No. 25,219
3 Claims. (Cl. 260—652.5)

This invention is directed to polymerizable emulsions of chloroprene or 2,3-dichlorobutadiene which are stabilized against premature polymerization by the incorporation therein of alkali metal salts of nitrous acid.

In the polymerization of 2-chloro-1,3-butadiene (hereafter called chloroprene) or 2,3-dichloro-1,3-butadiene (hereafter called dichlorobutadiene), or mixtures of these monomers, an aqueous emulsion of the monomers is first prepared, which emulsion contains the emulsifying agent and the modifier to be used in the polymerization. In order to obtain a polymer having optimum properties, it is important that the polymerization should proceed at a carefully controlled rate, and that it should be stopped when the desired degree of polymerization has been reached.

However, when the emulsion has been prepared, premature polymerization sometimes occurs. This polymerization is, of course, objectionable. Furthermore, this premature polymerization is an exothermic reaction which may boil the emulsion out of the reaction kettle due to uncontrolled evolution of heat.

Some compounds which will prevent the premature polymerization of chloroprene or dichlorobutadiene in emulsions adversely affect the subsequent controlled polymerization or the properties of the product. For example, air will prevent the spontaneous polymerization of chloroprene or dichlorobutadiene. However, it is difficult to add air in measured amounts. Phenothiazine can be used to inhibit the spontaneous polymerization but large amounts are required, and the phenothiazine present imparts an undesirable gray color to the resulting product.

It is therefore the object of this invention to prepare an emulsion of chloroprene or dichlorobutadiene, or mixtures of these monomers, which emulsion is stabilized against premature polymerization. It is a further object of this invention to prepare an emulsion of the heretofore described monomers or monomeric mixtures, which emulsion yields a latex or isolated polymer having desirable properties. These and other objects will become apparent in the following description and claims.

More specifically, the present invention is directed to a polymerizable emulsion of 2-chloro-1,3-butadiene or 2,3-dichloro-1,3-butadiene, or mixtures of these two monomers, stabilized against premature polymerization by incorporating therein from 0.08 to 1.50 parts by weight of an alkali metal salt of nitrous acid per 100 parts of total monomers.

According to this invention, conventional methods are utilized to prepare an aqueous emulsion of the monomeric material, an emulsifying agent, and, from 0.08 to 1.50 parts, by weight, per 100 parts of the monomeric material of an alkali metal salt of nitrous acid. The preferred salt is sodium nitrite. The use of less than 0.08 part of said salt gives insufficient stabilization and the use of more than 1.50 parts does not appear to provide any additional stabilization. The preferred amount is 0.20 to 1.0 part.

The monomeric material utilized according to the present invention is either chloroprene, dichlorobutadiene, or a mixture of these two monomers. The proportion of monomeric material present in the aqueous emulsion is not critical. In general, 30 to 60%, by weight, based on the total weight of the solution, is the range of concentrations of monomer which will be used in the preparation of a synthetic elastomer.

The emulsifying agent may be any of the surface active agents customarily used in the preparation of chlorobutadiene polymers. Examples of suitable emulsifying agents are the alkali metal or ammonium salts of rosin or rosin derivatives, such as wood rosin, disproportionated rosin or partially polymerized rosin, fatty acid soaps, water-soluble salts of fatty alcohol sulfates, water-soluble salts of alkylated aromatic sulfonic acids, water-soluble salts of formaldehyde condensation products with aromatic sulfonic acids such as naphthalene-sulfonic acid, long-chain alkyl betaines such as C-cetylbetaine, quaternary ammonium compounds such as (dodecylbenzyl) trimethylammonium chloride, or nonionic surface active agents such as the ethylene oxide or propylene oxide condensation products of compounds containing reactive hydrogen atoms such as the condensation product of ten moles of ethylene oxide with one mole of nonylphenol.

The aqueous emulsion may be slightly acidic, neutral, or alkaline. It is preferred, however, to utilize a pH in the range of 6 to 13.5.

Any of the modifiers usually used in the polymerization of chlorobutadienes may be incorporated in the emulsion. Such modifiers include alkyl mercaptans, sulfur, iodoform, and dialkylxanthogen disulfides.

The polymerization of the monomers can be effected in the stabilized emulsion by the addition of the usual catalytic agents such as alkali metal or ammonium persulfates or ferricyanides. The polymerization may be carried out between 0° and 60° C., preferably between 15 and 50° C.

Polymerization may be stopped at the desired point by the addition of agents such as phenothiazine and 4-tert-butyl catechol, as described in U.S. 2,576,009. If desired, unreacted monomer may be removed from the polymerization system by known methods; as, for example, the method described in U.S. 2,467,769.

The product of the present invention may be used as a latex or the polymer may be isolated in known ways as, for example, by a freezing technique such as is described in U.S. 2,187,146, or by drum drying.

It has been found that latices prepared from the stabilized emulsions of this invention have exceptionally good properties. They are lighter colored, have lower surface tension, and better compoundability than latices prepared from emulsions containing no nitrite stabilizer. Films prepared from these latices in conventional ways have higher uncured tensile strength. This is particularly true when sodium nitrite is used as the stabilizing agent.

Another advantage of the use of the nitrite salt in stabilizing the emulsions prior to polymerization is that it facilitates the removal of the unreacted monomer from the latex after the polymerization step is completed. When the nitrite salt has been incorporated into the emulsion, there is less tendency of the latex to coagulate during monomer removal and less pluggage of equipment occurs than is the case when no nitrite salt is present in the latex.

Representative examples illustrating the present invention follow.

EXAMPLE 1

Emulsions containing varying amounts of sodium nitrite were prepared in the following manner:

Solutions A and $B_1$–$B_6$, having the composition hereinafter shown, were prepared separately under nitrogen.

| Solution A: | Parts by weight |
|---|---|
| Chloroprene | 44 |
| Dichlorobutadiene | 56 |
| Disproportionated rosin | 3.4 |

| Solutions $B_1$–$B_6$: | |
|---|---|
| Water | 83.7 |
| Potassium hydroxide | 1.15 |
| Sodium nitrite | (¹) |

¹ As shown in Table I.

Solution A and solution $B_1$ were poured into a nitrogen-swept bottle, sealed with a stopper containing a thermometer so positioned that the bulb was below the liquid surface. The contents of the bottle was emulsified by shaking the bottle for one minute. Similarly, emulsions were prepared from solution A and each solution $B_2$ through $B_6$. The bottles were left sealed under nitrogen at ambient temperatures (25–33° C.) and observed for any premature polymerization. Since polymerization is exothermic, any temperature rise in the emulsion above ambient temperature was taken as indicative of premature polymerization. The results are shown in Table I.

*Table I*

| Parts $NaNO_2$ | Maximum temperature rise (° C.) during 3 hrs. |
|---|---|
| $B_1$ none (control) | 13 in 30 minutes.¹ |
| $B_2$ 0.08 | 8. |
| $B_3$ 0.16 | 4. |
| $B_4$ 0.33 | 1. |
| $B_5$ 0.66 | 0. |
| $B_6$ 1.32 | 0. |

¹ Reaction terminated at 30 minutes by shortstopping with phenothiazine and p-tert-butyl catechol.

EXAMPLE 2

Emulsions were prepared as in Example 1 except that potassium nitrite was used instead of sodium nitrite. The experiment was carried out as described in Example 1. Table II shows the observed rise in temperature over the ambient temperature.

*Table II*

| Parts $KNO_2$ | Maximum temperature rise (°C.) during 2 hrs. |
|---|---|
| None (Control) | 25 |
| 0.16 | 18 |
| 0.33 | 16 |
| 0.66 | 9 |

EXAMPLE 3

Emulsions containing varying ratios of chloroprene and dichlorobutadiene were prepared by a process similar to that described in Example 1.

| Solution A: | Parts by weight |
|---|---|
| Monomer composition | (¹) |
| Disproportionated rosin | 3.4 |
| Solution B: | |
| Water | 83.7 |
| Potassium hydroxide | 1.15 |
| Sodium nitrite | 0.33 |

¹ As shown in Table III.

Control emulsions were prepared in a similar way except that the sodium nitrite was omitted. The test was carried out as described in Example 1. Table III shows the observed rise in temperature.

*Table III*

| Monomer composition (parts) | | Maximum temperature rise (°C.) in 90 min. | |
|---|---|---|---|
| Chloroprene | Dichlorobutadiene | Control, no $NaNO_2$ | 0.33 pts. $NaNO_2$ |
| 100 | 0 | 17 | 0.5 |
| 72 | 28 | 14 | 0.5 |
| 44 | 56 | ¹ 13 | 1.0 |
| 25 | 75 | ¹ 18 | 3.0 |
| 0 | 100 | 17 | 2.0 |

¹ Reaction terminated at 30 minutes by shortstopping with phenothiazine and p-tert-butylcatechol.

EXAMPLE 4

To show the effect of different emulsifying agents, emulsions were prepared with compositions as shown in Table IV. In every case, a control was prepared which contained no sodium nitrite. The experiments were carried out as described in Example 1.

*Table IV*

| | Parts by weight | | |
|---|---|---|---|
| | Emulsion I | Emulsion II | Emulsion III |
| Solution A: | | | |
| Chloroprene | 44 | 44 | 44 |
| Dichlorobutadiene | 56 | 56 | 56 |
| Disproportionated rosin | 3.4 | | |
| Wood rosin | | 3.4 | |
| Myristic acid | | | 4 |
| Solution B: | | | |
| Water | 83.7 | 88 | 101 |
| Potassium hydroxide | | 1.22 | 1.39 |
| Sodium hydroxide | 0.82 | | |
| Sodium nitrite | 0.33 | 0.33 | 0.33 |

After 90 minutes emulsion I showed a maximum temperature rise of 5° C. as compared with 21° C. in the control containing no sodium nitrite. After 3 hours emulsion II showed a maximum temperature rise of 3° C. as compared with 7° C. in the control containing no sodium nitrite. After 3 hours emulsion III showed a maximum temperature rise of 8° C. as compared with 24° C. in the control containing no sodium nitrite.

EXAMPLE 5

To show the effect of a different type of emulsifying agent at two different pH's, emulsions I, II, III, and IV were prepared with compositions shown in Table V. The experiments were carried out as described in Example 1. Results are shown in Table V.

Table V

|  | Parts by weight | | | |
|---|---|---|---|---|
|  | I | II | III | IV |
| Solution A: |  |  |  |  |
|   Chloroprene | 50 | 50 | 50 | 50 |
|   Dichlorobutadiene | 50 | 50 | 50 | 50 |
| Solution B: |  |  |  |  |
|   Water | 100 | 100 | 100 | 100 |
|   Triethanolamine salt of p-dodecylbenzenesulfonic acid (purchased as "Ultrawet" 60L from the Atlantic Refining Co.) | 3.5 | 3.5 | 3.5 | 3.5 |
|   Sodium salt of condensation product of formaldehyde with naphthalenesulfonic acid (purchased as "Lomar" PW from Jacques Wolf and Co.) | 1 | 1 | 1 | 1 |
|   Sodium nitrite |  | 0.33 |  | 0.33 |
|   28% ammonia |  |  | 2.0 | 2.0 |
| Emulsion pH | 6.5 | 6.4 | 9.9 | 9.7 |
| °C. temperature rise during time shown below, minutes: |  |  |  |  |
|   25 | 1.4 | 0.4 | 17.6 | 0 |
|   28 |  |  | [1]21.8 | [1]0 |
|   50 | 4.6 | 1.0 |  |  |

[1] Test discontinued after 28 minutes.

As can be seen from Table V, the effect of the nitrite was observed at both the lower pH and the higher pH. The stabilizing effect was more marked at the higher pH.

EXAMPLE 6

A polymerization was carried out using the recipe of Example 1 except that 0.05 part of dodecyl mercaptan was added. For comparison, a control run was made using 0.01 part of phenothiazine instead of the sodium nitrite. The recipes are as follows:

|  | Parts by weight | |
|---|---|---|
|  | I | II |
| Solution A: |  |  |
|   Chloroprene | 44 | 44 |
|   Dichlorobutadiene | 56 | 56 |
|   Disproportionated rosin | 3.4 | 3.4 |
|   Dodecyl mercaptan | 0.05 | 0.05 |
|   Phenothiazine |  | 0.01 |
| Solution B: |  |  |
|   Water | 83.7 | 83.7 |
|   Potassium hydroxide | 1.15 | 1.15 |
|   Sodium nitrite | 0.33 |  |

Solutions A and B were mixed and emulsified under nitrogen for 3 minutes at 31° C. using a rapidly revolving, slotted disc agitator. The flasks were then set up under nitrogen as shown in FIGURE 1 of the Journal of Industrial and Engineering Chemistry, 40, 2193 (1948). During stirring for 15 minutes at ambient temperature, the temperature of emulsion I had risen only 3° C. whereas the temperature in emulsion II had risen 5° C.

The emulsions I and II were warmed by external heating to 40° C., the polymerization temperature. A 5% aqueous solution of potassium ferricyanide was introduced dropwise into each emulsion until polymerization was begun. 3.1 milliliters of catalyst were required to start polymerization in emulsion I as compared to 3.55 ml. for emulsion II. Thereafter, polymerization was regulated to the desired rate by control of the addition of ferricyanide solution. Four hours were required to reach a specific gravity of 1.141 at 40° C., which indicated a 90% conversion of monomeric material. At this point polymerization was stopped by the addition of 1.4 grams of a stabilizer emulsion of the following composition.

|  | Percent |
|---|---|
| Water | 31.9 |
| Sodium lauryl sulfate | 0.9 |
| Sodium salt of condensation product of naphthalene sulfonic acid and formaldehyde | 1 |
| Phenothiazine | 1 |
| p-Tert-butylcatechol | 1 |
| Toluene | 64.2 |

Unreacted monomer was stripped from the emulsions by means of a turbannular steam stripper as described in U.S. 2,467,769.

The properties of the latices prepared in the presence of sodium nitrite (I) and in the presence of phenothiazine (II) were compared in Table VI.

Table VI

|  | I (nitrite) | II (phenothiazine) |
|---|---|---|
| Color | Cream | Darker than I with an undesirable gray tint. |
| Surface tension (dynes/cm.) | 36 | 49. |
| Compoundability [1] | Good | Poor. |
| Tensile strength of films prepared from latex,[2] p.s.i.: |  |  |
|   Uncured | 3,600 | 2,750. |
|   Cured 60 min. at 141.5° C. in a circulating air oven. | 5,380 | 4,360. |

[1] Compoundability was measured as follows:
The latex was compounded using conventional techniques using the following recipe—

|  | Parts by weight |
|---|---|
| Latex solids | 100 |
| Sodium salt of sulfated methyl oleate | 3 |
| Sodium lauryl sulfate | 1 |
| N-phenyl-2-naphthylamine | 2 |
| Zinc oxide | 5 |

Films were prepared using the coagulant dipping process developed by the U.S. Rubber Co., as described in Cook and Fitch, "Neoprene Dipped Goods," Rubber Chemicals Division (now the Elastomer Chemicals Department), E. I. du Pont de Nemours and Company, Report No. 52–53, December 1952, pages 15–17. The films were examined visually for smoothness and uniformity of thickness. Smooth, uniform films were indicative of the latex having good compoundability. Compoundability was considered poor when the films were not smooth in appearance and were not of uniform thickness.
[2] The tensile properties were measured on films prepared for the compoundability study. Tests were carried out as described in ASTM Procedure D 412–51T.

EXAMPLE 7

To show the effect of sodium nitrite in a larger scale operation, a polymerization was carried out as described in Example 6, except that operations were scaled up to a 400-gallon kettle. Recipe I of Example 6 was used. A control polymerization was carried out using no sodium nitrite. Without removing unreacted monomers the latices were examined for coagulum and "strainability". Strainability is a measure of the amount of latex that will flow through a standard felt cloth having an area of 0.95 sq. cm. under a 5 mm. mercury differential in pressure. The cloth used for the test was manufactured by the American Felt Co., New York city, and was designated as Merchandise No. 8805. Unless the felt plugs, the test is discontinued when 500 ml. of latex have filtered. If the latex passes through the felt, it shows that the particles of the latex are all smaller than the pore size of the felt. If the latex plugs the felt, it shows that the latex contains some particles that are larger than a stable colloidal size. It has been found that such latices have a tendency to settle out during storage and that latices of low coagulum and high strainability show improved stability during stripping of the unreacted monomer.

The comparison of coagulum found and strainability of latices prepared in the presence and absence of sodium nitrite is shown in Table VII.

Table VII

|  | I (0.33 part NaNO₂) | II (no NaNO₂) |
|---|---|---|
| Coagulum (parts by weight per 100 parts of monomer) [2] | None | [1] 0.1–0.6 |
| Strainability (milliliters) | 500+ | [1] 75–140 |

[1] This represents data from several runs.
[2] The coagulum was weighed as wet coagulum containing approximately 80% dry polymer.

It is understood that potassium nitrite may be substituted for the sodium nitrite in the preceding examples to achieve substantially the same results in the described polymerizable emulsions.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A polymerizable, aqueous emulsion of a monomeric component taken from the group consisting of (a) 2-chloro-1,3-butadiene, (b) 2,3-dichloro-1,3-butadiene, and, (c) mixtures of (a) and (b), said emulsion being stabilized against premature polymerization by incorporating therein from 0.08 to 1.50 parts per 100 parts of said monomeric component, by weight of an alkali metal salt selected from the group consisting of sodium nitrite and potassium nitrite.

2. A polymerizable emulsion according to claim 1 wherein the alkali metal salt is sodium nitrite present in an amount within the range of from 0.20 to 1.0 part by weight per 100 parts of said monomeric component.

3. A polymerizable emulsion according to claim 1 wherein the alkali metal salt is potassium nitrite present in an amount within the range of from 0.20 to 1.0 part by weight per 100 parts of said monomeric component.

References Cited in the file of this patent
UNITED STATES PATENTS

| | | |
|---|---|---|
| 2,900,421 | Kharasch | Aug. 18, 1959 |
| 2,914,497 | Keller | Nov. 24, 1959 |